United States Patent [19]

Fukuma et al.

[11] Patent Number: 4,987,588
[45] Date of Patent: Jan. 22, 1991

[54] DATA TRANSMISSION PROCESSING MACHINE

[75] Inventors: Yoshitaka Fukuma; Taiji Iizuka, both of Nara, Japan

[73] Assignee: Sharp Kabushiki Kaisha, Osaka, Japan

[21] Appl. No.: 409,998

[22] Filed: Sep. 19, 1989

Related U.S. Application Data

[63] Continuation of Ser. No. 873,280, Jun. 9, 1986, abandoned, which is a continuation of Ser. No. 575,672, Jan. 31, 1984, abandoned.

[30] Foreign Application Priority Data

Feb. 3, 1983 [JP] Japan ................................. 58-17071

[51] Int. Cl.⁵ ............................................ H04M 11/00
[52] U.S. Cl. .................................... 379/98; 379/93; 379/97; 379/442
[58] Field of Search ................... 379/91, 93, 97, 96, 379/98, 110, 442; 375/5, 8

[56] References Cited

U.S. PATENT DOCUMENTS

| | | | |
|---|---|---|---|
| 3,932,709 | 1/1976 | Hoff et al. | 179/2 DP X |
| 4,291,198 | 9/1981 | Anderson et al. | 179/2 DP |
| 4,436,956 | 3/1984 | Schreiber | 179/2 C |
| 4,503,288 | 3/1985 | Kessler | 179/2 DP |
| 4,524,244 | 6/1985 | Faggin et al. | 179/2 DP |

FOREIGN PATENT DOCUMENTS

| | | | |
|---|---|---|---|
| 33821 | 8/1981 | European Pat. Off. | 179/2 DP |
| 61316 | 9/1982 | European Pat. Off. | 375/8 |

OTHER PUBLICATIONS

American Telephone & Telegraph, Comp., Technical Reference, "Data Set 202E," Mar. 1968.
Racal-Vadic, Advertisement "The Invisible Modem is Here", *Telecommunications*, Jan. 1981, p. 23.
*Computer & Electronics*, Oct. 1984, p. 104, New Products, "Telephone/Modem".

*Primary Examiner*—Jin F. Ng
*Assistant Examiner*—Stella L. Woo

[57] ABSTRACT

A data transmission processing machine interposed between a host computer and a telephone line comprises a telephone circuit, a modem, a keyboard, and a mode selection switch. Responsive to a mode selected by the mode selection switch, the keyboard is operated either as a dial for the telephone or as a data entry keyboard for the modem.

4 Claims, 2 Drawing Sheets

DATA TRANSMISSION PROCESSING MACHINE

This application is a continuation of application Ser. No. 873,280 filed on Jun. 9, 1986, now abandoned, which is a continuation of applicaton Ser. No. 575,672 filed on Jan. 31, 1984 and now abandoned.

BACKGROUND OF THE INVENTION

The present invention relates to a data transmission processing machine interposed between a host computer and a telephone line and, more particularly, to a data transmission processing machine serving as a telephone function device and a modem function device.

Recently, data communications is highly evaluated. To rapidly transmit many data, a modem is needed. FIG. 1 shows a conventional data transmission processing machine. This machine comprises a computer unit 1 and a telephone unit 2, and a modem unit 3. The computer unit 1 comprises a host central processing unit (CPU) A, a full-key unit B, and a data entry keys unit C. Data are inputted into the host CPU A via the keys units B and C, so that the inputted data are transmitted through a telephone line 4 with the help of the modem unit 3.

In the system of FIG. 1, it is difficult to make each of the computer unit 1, the telephone unit 2, and the modem unit 3 compact and portable because the conventional keyboard occupies a large area. The keyboard is referred to as the full-key unit B, the data entry keys unit C and a dial unit of the telephone unit 2. In addition, all of the units 1, 2 and 3 are individually provided.

SUMMARY OF THE INVENTION

Accordingly, it is an object of the present invention to provide an improved data transmission processing machine which is compact and portable.

It is another object of the present invention to provide an improved data transmission processing machine in which a telephone unit and a modem unit are combined integrally.

It is a further object of the present invention to provide an improved data transmission processing machine in which a telephone dial and a data entry keyboard for data transmission in a modem unit are combined.

It is a further object of the present invention to provide an improved data transmission processing machine serving as a telephone only, so that the telephone function does not provide any load for a computer unit.

Other objects and further scope of applicability of the present invention will become apparent from the detailed description given hereinafter. It should be understood, however, that the detailed description of and specific examples, while indicating preferred embodiments of the invention, are given by way of illustration only, since various changes and modifications within the spirit and scope of the invention will become apparent to those skilled in the art from this detailed description.

According to a preferred embodiment of the present invention, a data transmission processing machine interposed between a host computer and a telephone line comprises a telephone unit serving for a telephone function, a modem unit serving for a modem function, a keyboard serving for a telephone dial for the telephone unit and a data entry keyboard for the modem unit, a mode selection switch for selecting either the telephone function or the modem function.

BRIEF DESCRIPTION OF THE DRAWINGS

The present invention will be better understood from the detailed description given hereinbelow and the accompanying drawings which are given by way of illustration only, and thus are not limitative of the present invention and wherein.

DETAILED DESCRIPTION OF THE INVENTION

Figure 1:
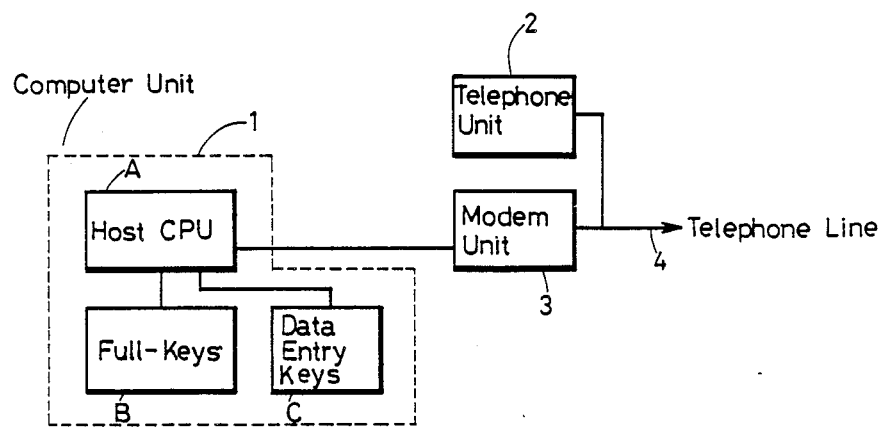
FIG. 1 shows a block diagram of a conventional data transmission processing machine.
Figure 2:
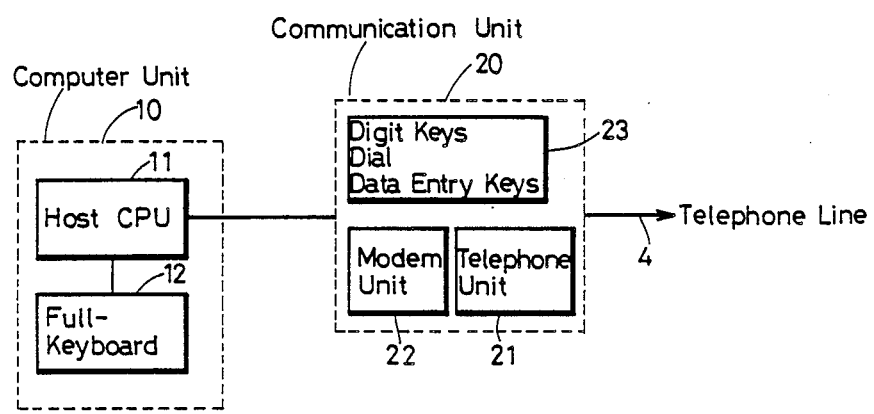
FIG. 2 shows a block diagram of a data transmission processing machine according to the present invention.

FIG. 2 shows a block diagram of a data transmission processing machine according to the present invention.

The machine comprises a computer unit 10 and a communication unit 20 which are connected via a telephone line 4. The computer unit 10 comprises a host CPU 11 and a full-keyboard 12. The communication unit 20 comprises a telephone unit 21, a modem unit 22, and a keyboard 23. The keyboard 23 seves as a dial for the telephone unit 21, and a data entry keyboard for the modem unit 22.

Figure 3:
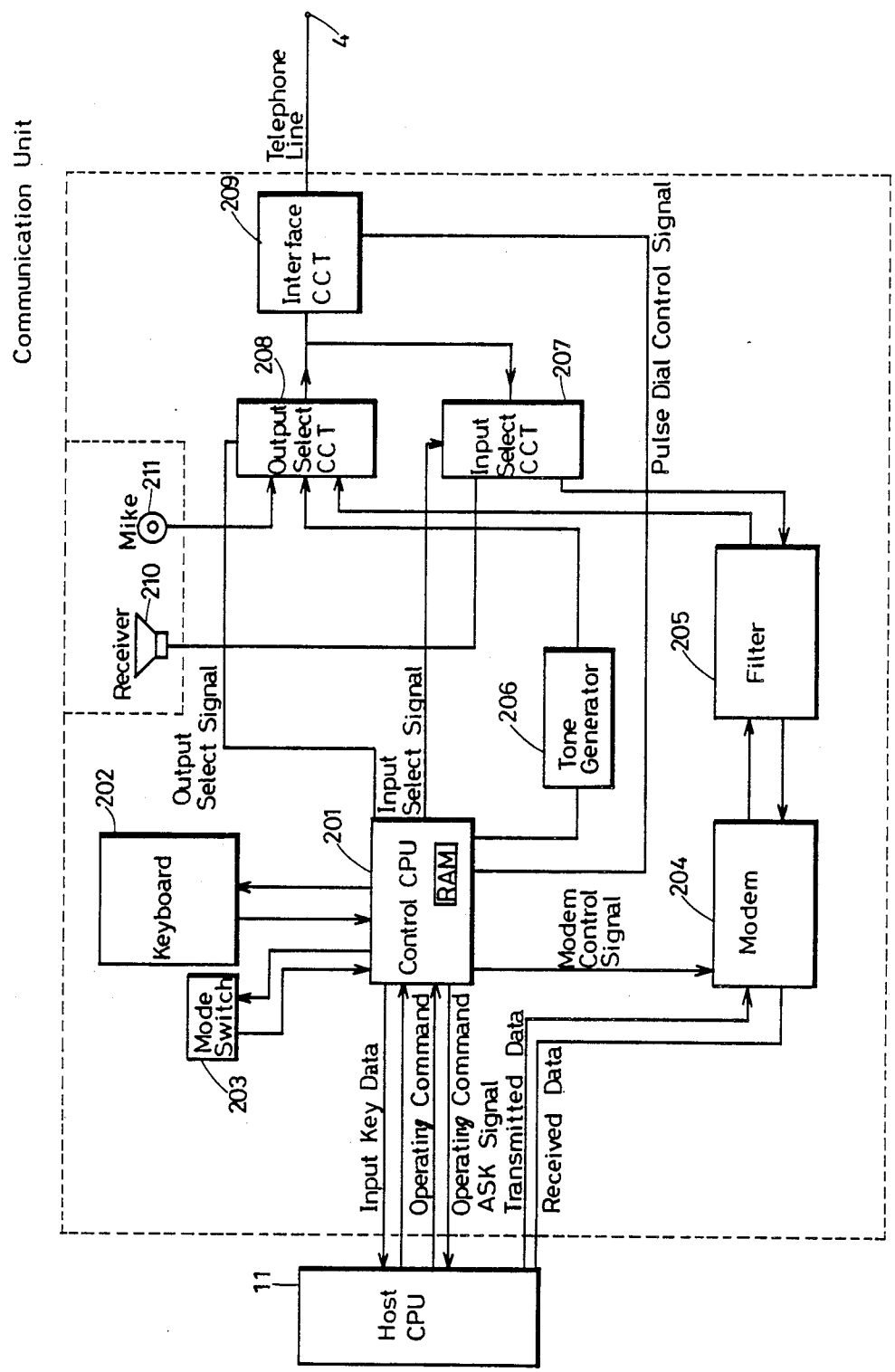
FIG. 3 shows a block diagram of a communication unit in the data transmission processing machine of FIG. 2.

FIG. 3 shows a block diagram of the communication unit 20.

Referring to FIG. 3, the communication unit 20 comprises a control CPU 201 including a random access memory (RAM), a keyboard 202, a mode switch 203, a modem 204, a filter 205, a tone generator 206, an input select circuit 207, an output select circuit 208, an interface circuit 209, a receiver 210, and a microphone 211.

To the communication unit 20, the host CPU 11 is connected for generating an operating command, and data to be transmitted. The control CPU 201 generates input key data to the host CPU 11 and an operating command acknowledge (ACK) signal to the CPU 11 in response to the operating command. The data to be transmitted are applied form the host CPU 11 to the modem 204 while the modem 204 generates the received data to the CPU 11.

The keyboard 202 comprises numeral key switches and symbol key switches both serving as the telephone dial and the data entry keyboard actuated to provide the modem function for data transmission. The mode switch 203 is actuated to select either the modem function mode or the telephone function mode. During the modem function mode, data obtained by operating the key switches in the keyboard 202 are considered to be the data entry key code data and transferred into the host CPU 11. During the telephone function mode, data obtained by operating the key switches in the keyboard 202 are considered to be dial key code data for the telephone dial key code data or auto-dial key code data and transferred into the RAM in the control CPU 201 for storage. The modem 204 is operated to transmit the code data via the telephone line 4. The filter 205 is provided for passing the data received via the telephone line 4 from a different machine communicating through the modem 204 to the present machine and removing quantized signals among the data signals to be outputted from the modem 204 to the telephone line 4.

The tone generator 206 is provided for generating tones corresponding to the telephone numbers selected.

Either the input select circuit 207 or the ouput select circuit 208 is responsive to an input select signal or an output select signal from the control CPU 201 for inputting or outputting data. The interface circuit 209 is provided for interfacing the communication unit 20 and the telephone line 4. The receiver 210 and the microphone 211 form a hand set.

IN OPERATION

The Telephone Function Mode

To provide the telephone function mode, the mode switch 203 is operated to select the telphone function mode, so that the keyboard 202 is operated only for the telephone dial. When some numeral key switches are actuated to input telephone number data, the coded dial data are stored into the RAM in the control CPU 201. The coded dial data stored in the RAM are applied to the tone generator 206, so that the tone generator 206 generates tones corresponding to the selected telephone number data. The tones are outputted into the telephone line 4 via the interface circuit 209. At the same time, the control CPU 201 generates a specific input select signal and a specific output select signal into the input select circuit 207 and the output select circuit 208, so that these select circuits are made operable. The receiver 210 and the microphone 211 are made operable.

In case a telephone is a different machine communicating with the present machine cannot receive the generated tones, the control CPU 201 provides a pulse dial control signal into the interface circuit 209 and, further, the telephone line 4, so that the connection of the communcating telephone to the present telephone is enable forcibly.

The Modem Function Mode

To provide the modem function mode, the mode switch 203 is operated to select the modem function mode, so that the control CPU 201 provides a modem control signal to make the modem 204 operable. At the same time, each of the input select circuit 207 and the output select circuit 208 is operated for an input device and a output device for the filter 205. During the modem mode, the keyboard 202 is operated as the data entry keyboard for the modem 204. When specific data are manually inputted, this data is inputted, as the key input data, into the host CPU 11 via the control CPU 201 for data processing. The thus processed data are transferred into the modem 204 as the data to be transmitted. The output of the modem 204 is applied to the filter 205 and the interface circuit 209, so that the data are transmitted from the interface 209 via the telephone line 4. Data are received via the telephone line 4 by the interface circuit 209, so that the received data are introduced into the host CPU 11 via the filter 205 and the modem 204.

In the modem function mode, when the control CPU 201 receives the operating command from the host CPU 11, the CPU 201 is operated so as to connect the telephone line 4 of the present machine with the telephone line in the communicating machine. It may be possible that the telephone number data to provide the corresponding tones by the tone generator 206 are inputted via the full-keyboard 12, so that the host CPU 11 provides the inputted telephone number data as the command. Alternatively, the keyboard 202 is operated so that the telephone number data are manually inputted into and stored in the RAM in the control CPU 201.

As described above, during the telephone mode, the host CPU 11 is completely separated from the communicating unit 20, so to prevent any load on the control CPU 201 from the host CPU 11.

As described above, in accordance with the present invention, the telephone function unit and the modem function unit are united and, in addition, the telephone dial keyboard and the modem data entry keyboard are combined. Therefore, the data transmission processing machine is made portable, compact and reasonable. Since the telephone is operated as being independent from the operation of the host CPU, it is possible that the host CPU functions to present additional tasks except the telephone during the telephone function mode.

The invention being thus described, it will be obvious that the same may be varied in many way. Such variations are not to be regarded as a departure from the spirit and scope of the invention, and all such modifications are intended to be included within the scope of the following claims.

What is claimed is:

1. A communication device coupled between a telephone line and a host computer, said communication device operable in a telephone mode and a modem mode wherein during said telephone mode said communication device transmits and receives voice communication over said telephone line and during said modem mode said communication device transmits and receives processed data over said telephone line, said communication, device comprising:

voice communication means transmitting and receiving said voice communication over said telephone line;

full keyboard means functioning as a telephone dial providing dial data during said telephone mode and functioning as a data entry means providing input data during said modem mode;

modem means coupled to said host computer and said telephone line communicating said processed data therebetween;

mode selection means designating operation of said communication device in one of said telephone mode or said modem mode; and control CPU means, coupled to said host computer, said full keyboard means, said modem means, and said mode selection means, said control CPU means operable in response to said mode selection means in said telephone mode to disable said modem means and to provide said dial data as output along said telephone line and to enable said voice communication means to transmit and receive said voice communication over said telephone line, and said modem mode to enable said modem means for communication of said processed data between said telephone line and said host computer and to couple said input data to said host computer whereby said host computer outputs said processed data to said modem means.

2. The communication device of claim 1 further comprising:

tone generator means coupled to said control CPU means for generating tones wherein said dial data is transmitted along said telephone line as corresponding generated tones;

output selection circuit means, coupled to said voice communication means, said tone generator means, and said modem means, for selecting one of said voice communication, said processed data, or said dial data as output to said telephone line in response to an output selection signal from said control CPU means; and input selecton circuit means, coupled to said voice communication means and said modem means for selecting one of said voice communication or said processed data as input from said telephone line in response to an input selection signal from said control CPU means.

3. A communication system comprising:

a telephone line;

a host computer; and a communication device, coupled between said telephone line and said host computer, operable in a telephone mode and a modem mode wherein during said telephone mode said communication device transmits and receives voice communication over said telephone line and during said modem mode said communication device transmits and receives processed data over said telephone line, said communication device comprising, voice communication means transmitting and receiving said voice communication over said telephone line;

full keyboard means functioning as a telephone dial providing dial data during said telephone mode and functioning as a data entry means providing input data during said modem mode;

modem means coupled to said host computer and said telephone line communicating said processed data therebetween;

mode selection means designating operation to said communication device in one of said telephone mode or said modem mode; and control CPU means, coupled to said host computer, said full keyboard means, said modem means, and said mode selection means, said control CPU means operable in response to said mode selection means in (a) said telephone mode to disable said modem means, to provide said dial data as output along said telephone line and to enable said voice communication means to transmit and receive said voice communication over said telephone line, and (b) said modem mode to enable said modem means for communication of said processed data between said telephone line and said host computer and to couple said input data to said host computer whereby said host computer outputs said processed data to said modem means.

4. The communication system of claim 3 wherein said communication device further comprises:

tone generator means coupled to said control CPU means for generating tones wherein said dial data is transmitted along said telephone line as corresponding generated tones;

output selection circuit means, coupled to said voice communication means, said tone generator means, and said modem means, for selecting one of said voice communication, said processed data, or said dial data as output to said telephone line in response to an output selection signal from said control CPU means; and input selection circuit means, coupled to said voice communication means and said modem means for selecting one of said voice communication or said processed data as input from said telephone line in response to an input selection signal from said control CPU means.

* * * * *